Jan. 7, 1969 P. E. STRIFLER ET AL 3,420,543
SPRING SYSTEM FOR RIGID AXLES OF VEHICLES
Filed April 20, 1966 Sheet 1 of 2
FIG. 1
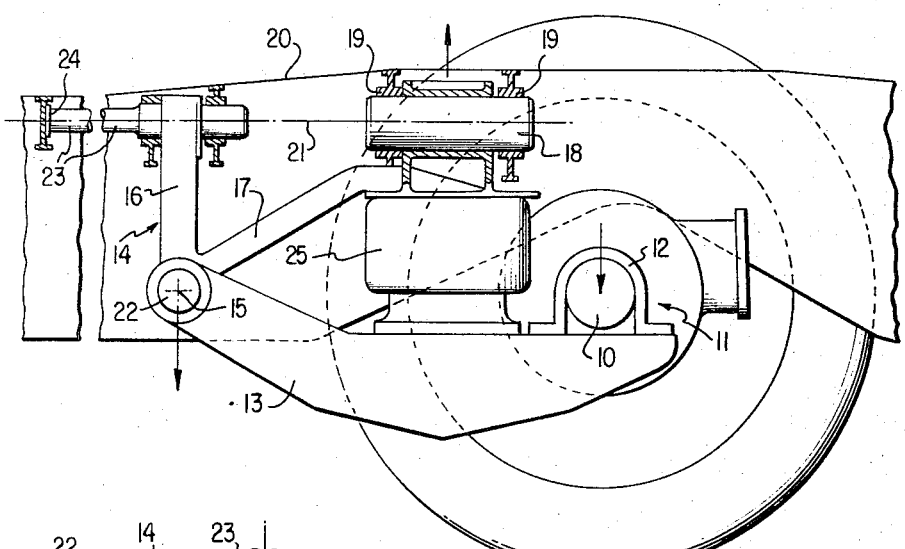
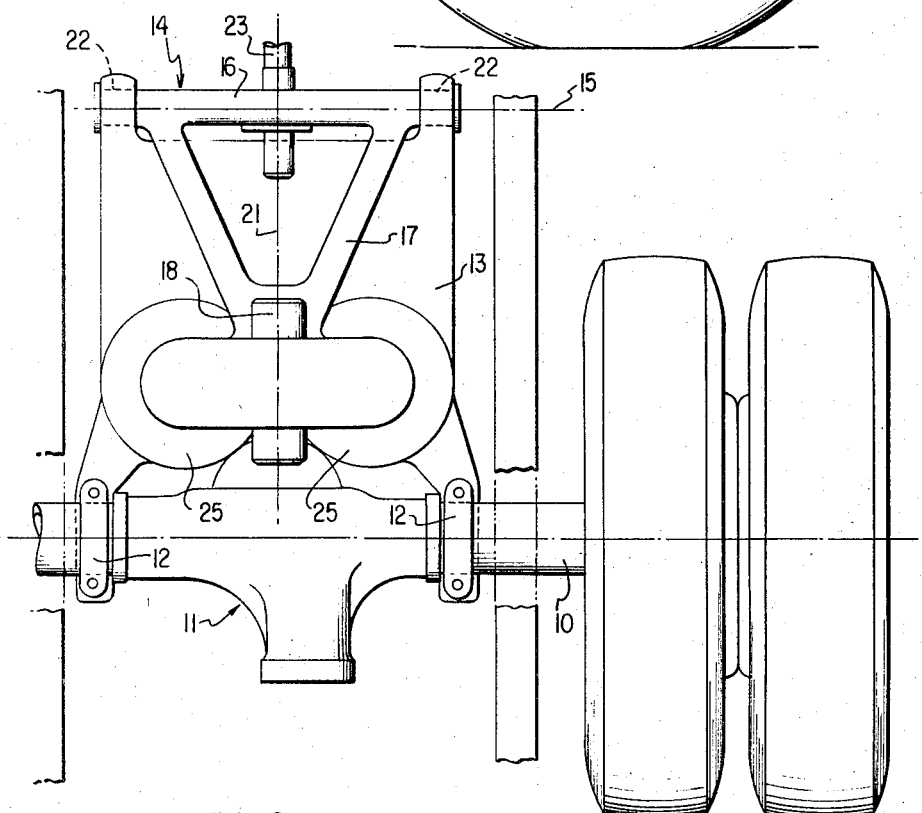
FIG. 2
INVENTOR.
PAUL E. STRIFLER
DIETHER SCARPATETTI __United States Patent Office__

3,420,543
Patented Jan. 7, 1969

3,420,543
SPRING SYSTEM FOR RIGID AXLES OF VEHICLES
Paul E. Strifler, Dettingen, Teck, and Diether Scarpatetti, Stuttgart, Germany, assignors to Daimler-Benz Aktiengesellschaft, Stuttgart-Unterturkheim, Germany
Filed Apr. 20, 1966, Ser. No. 543,998
Claims priority, application Germany, Apr. 23, 1965,
D 47,101
U.S. Cl. 280—112               16 Claims
Int. Cl. B60g *15/02;* B60g *11/64*

ABSTRACT OF THE DISCLOSURE

A vehicle spring suspension universally spring supporting a rigid axle about a central longitudinal axis spaced above a transverse axis at the height of the wheel centers, and employing separate springs for pivotal movement about each of the axes. A joint body is pivotally mounted to the vehicle frame about a longitudinal axis with roll springs therebetween. A guide member is pivotally mounted to the joint body about a transverse axis with rocking springs therebetween, and the rigid axle being carried by the guide member.

Background of the invention

With a known spring system of the aforementioned type, the two joint axes intersect one another. Consequently, the joint cross axis is arranged considerably higher compared to the wheel centers as a result of the securing of the joint at the frame bottom side, which leads during spring movements of the vehicle axles to disadvantageous displacements thereof in the vehicle longitudinal direction. The spring support of the vehicle axle takes place by means of two compression coil springs arranged laterally of the wheels between the axle and the vehicle frame, whose characteristics are determinative both for the stroke movements as also for the rolling movements of the vehicle about the aforementioned longitudinal axis of the joint. However, in order to achieve a good driving behavior and driving condition, a relatively soft anti-stroke spring system is indispensable compared to a comparatively hard anti-roll spring system, especially as the latter is to fulfill a stabilizer-like function as regards cross stability of the vehicle.

As can be readily recognized from the foregoing considerations, these two contradictory requirements of a spring system of the aforementioned known type cannot be fulfilled.

A further disadvantage of the known spring system results from the arrangement of the springs between the axle body and the vehicle frame. During rolling of the vehicle superstructure about the longitudinal axis of the joint, one spring is compressed and the other spring is correspondingly expanded whence very different spring paths are available on both sides of the vehicle for a pitching movement of the axle.

Summary of the invention

The present invention aims at eliminating all of these disadvantages and at fulfilling the conditions for a completely satisfactory driving behavior of the vehicle. The present invention solves the underlying problems in that the joint cross axis is disposed essentially at the height of the wheel centers and that the joint longitudinal axis is arranged—approximately in direct proximity of the vehicle floor—above the joint cross axis and that separate spring means are provided for the pivot movements of the longitudinal guide member about the respective joint axes.

The arrangement of the cross axis of the guide member at the height of the wheel centers is already known, as such, with other axle arrangements, i.e., with those which are not constructed in a joint-like manner as described hereinabove. As a result thereof, also with the present invention, a displacement of the vehicle axle in the vehicle longitudinal direction is avoided far-reachingly during spring deflections thereof because the tangent to the circle described by the vehicle axle during spring deflections thereof extends in the starting point of the pivot movement, i.e., in the normal position, essentially perpendicularly to the road surface.

The raised or higher location of the longitudinal axis of the joint at the vehicle floor, i.e., in the normal condition in or even above the upper edge of the frame, entails for the vehicle the advantage of a better cross stability, especially with vehicles having a high center of gravity, for example, buses. This already kinematically improved cross stability is still further improved considerably according to the present invention by the arrangement of separate spring means for the roll movement of the vehicle about the joint longitudinal axis. These spring means may—depending on given requirements—be kept as stiff as desired without influencing the anti-stroke spring system of the rigid axle for which may be provided also separate, comparatively soft spring means in contrast to the anti-roll spring means.

The construction of the universal joint-like joint can take place in principle in any known manner. In the case that the joint consists of a torsion-resistant and bending-resistant joint body and of at least one joint pin for each axis of rotation, the present invention proposes that the joint body is constructed of fork-like shape and is provided with an upwardly directed fork-arm extending essentially prependicularly to the road surface and with an upwardly inclined fork-arm extending toward the respective vehicle axle, and that the joint body is pivotally supported at the vehicle body above the inclined fork arm about an axis extending in the vehicle longitudinal direction by means of a joint pin and possibly by means of a further joint pin secured at the upright fork-arm and that the fork bottom or base is constructed of pin shape on both sides thereof and serves for the pivotal support of the longitudinal guide member.

The construction of the fork arms as to the details thereof is thereby completely left to the preference of the engineer. Thus, for example, a plate-shaped construction thereof is feasible. Preferably, however, the present invention provides that the fork arms are constructed of yoke-shape in the manner of two isosceles triangles whereby the fork bottom is formed by the common base of the two triangles. This construction of the joint body is light in weight and economizing in material with simultaneous high form-rigidity.

Several possibilities exist for the arrangement and construction of both the anti-roll spring means as well as the anti-stroke spring means, for example, two coil-shaped compression springs arranged laterally of the upright fork arm betwen off-set-like deflecting levers thereof and the vehicle body are possible as anti-roll spring means. A coil-shaped compression spring arranged in the vehicle center, for example, between the vehicle axle body and the vehicle body would be possible as anti-stroke spring means. Preferably, however, the present invention provides that the anti-stroke spring means is arranged between the inclined fork arm and the longitudinal guide member and the anti-roll spring means between the upright fork arm and the vehicle body—possibly by the use of deflection or shifting levers or the like.

Furthermore, the present invention proposes that two pneumatic spring bellows, one on each side of the vehicle center, are provided as anti-stroke spring means and a conventional torsion spring rod as anti-roll spring means which is arranged in a non-rotatable manner, on the one hand, at the upright fork arm and, on the other, at the vehicle body.

By the use of the arrangement of the anti-stroke spring means between the longitudinal guide member and the joint body, any influencing of the anti-roll spring means is precluded with certainty. In principle, the anti-stroke spring means could be arranged naturally also between the axle body and the joint body. However, the arrangement between the longitudinal guide member and the joint body in accordance with the present invention offers the advantage—for example, with a longitudinal guide member bent downwardly in the longitudinal direction—to arrange comparatively low the anti-stroke spring means. Therebeyond, it is also possible—by changing the lever arm "vehicle axle-spring axis"—to match a given spring characteristic to the requirements as regards spring softness and spring path. Instead of the aforementioned two pneumatic spring bellows, of course, a single correspondingly strong pneumatic spring bellows to be secured in the vehicle center is also possible.

The arrangement of the anti-stroke spring means between the joint body and the longitudinal guide member presupposes, of course, in addition to the aforementioned rigidity of the joint body, also a corresponding rigidity of the longitudinal guide member which is particularly true for the securing places thereof at the axle body and the bearing places at the joint body. At the same time, the longitudinal guide member, however, is to be constructed of light weight in order to keep as small as possible the unsprung masses. For the purpose of fulfilling this requirement, the present invention proposes that the longitudinal guide member is constructed of box-like shape and the bearing places at the joint body and the securing places at the axle body are located at the corners of this box-shaped longitudinal guide member.

The advantages of use of a torsion rod as anti-roll spring means are, on the one hand, small space requirements, simple construction and inexpensive manufacture of the torsion spring rod, and on the other hand, the twisting zone of the vehicle chassis or frame or body normally extending during rolling movements of the vehicle from axle to axle is considerably shortened by the securing place of the torsion rod spaced comparatively far from the respective axle so that a correspondingly light-weight construction is now necessary for the torsion-free zone.

The torsion rod spring can be arranged at any suitable place of the plane perpendicular to the road surface and containing the vehicle longitudinal axis. For example, with an eccentric arrangement thereof with respect to the longitudinal axis of the joint, the torsion rod would be stressed, in addition to being stressed in torsion, also in bending, whence approximately flat spring rods with rectangular cross section would be suitable. However, the present invention preferably recommends a torsion rod with circular cross section and, accordingly, proposes that the torsion rod is arranged in the longitudinal axis of the joint and is rotatably supported at the vehicle body on both sides of its securing places at the upright fork arm.

The arrangement in the longitudinal axis of the joint brings about, on the one hand, a pure torsional stressing of the torsion rod, and, on the other, signifies in conjunction with the two bearing supports thereof at the vehicle body on both sides of the connection with the upright fork arm, a reinforcement of the support of the entire joint body at the vehicle floor. In case the main bearing place of the joint body at the vehicle frame is not disposed directly above the vehicle axle but instead between the same and the joint cross axis, for example, is located approximately above the pneumatic spring bellows and therefore would have to absorb a corresponding tilting moment, the aforementioned additional bearing support of the torsion rod signifies a considerable relief. Consequently, the main bearing pin otherwise constructed of comparatively great length, can now be constructed relatively short as almost the entire tilting moment is now absorbed—in the form of bending forces—by the additional support.

As already mentioned above, the problem of the anti-roll spring system may also be solved, in addition with a torsion rod, also with other spring means, for example, as already indicated above by means of coil compression springs arranged on both sides of the upright fork arm.

Another modified construction of the present invention provides that conventional rubber cushions or buffers are arranged as anti-roll spring means between the upright form arm—on both sides of the joint longitudinal axis—and the vehicle body.

The cushions or buffers may thereby be secured either at the vehicle body or laterally at the upright fork arm. The advantage of this construction lies in the extraordinarily inexpensive manufacture and simple interchangeability of the rubber buffers or cushions.

Since with this latter construction the torsion rod is dispensed with, it is recommended—for reasons already described above—for relieving the main bearing place of the joint body at the vehicle floor to support the upright fork arm by means of a further joint pin also arranged in the joint longitudinal axis at the vehicle floor.

Accordingly, it is an object of the present invention to provide a spring suspension for rigid axles of vehicles, especially motor vehicles, which eliminates by simple means the aforementioned shortcomings and drawbacks encountered with the prior art constructions.

Another object of the present invention resides in a rigid axle and spring support thereof for vehicles which minimizes displacements of the rigid axle in the vehicle longitudinal direction during spring-stroke deflections thereof.

A further object of the present invention resides in a spring system for a rigid axle of vehicles which brings into harmony the contradictory requirements for good driving comfort of soft anti-stroke springs and hard anti-roll springs for the cross stability of the vehicle.

Still another object of the present invention resides in a spring system for rigid axles in motor vehicles in which different spring paths are eliminated in case of simultaneous movements about two orthogonal axes.

Still a further object of the present invention resides in a spring system for rigid axles in vehicles which imparts a considerably improved cross stability especially to vehicles having a high center of gravity.

Another object of the present invention resides in a spring system for spring-supporting a rigid axle at the vehicle superstructure which is so constructed and arranged that a mutual influencing of the anti-pitch or anti-stroke springs and of the anti-roll springs is precluded with certainty.

A further object of the present invention resides in a spring system for rigid axles of vehicles which is extremely simple in construction, inexpensive to manufacture, and easy to install.

*Brief description of the drawing*

These and further objects, features, and advantages of the present invention will become more obvious from the following description when taken in connection with the accompanying drawing which shows, for purposes of illustration only, two embodiments in accordance with the present invention, and wherein:

FIGURE 1 is a side elevational view, partly in cross section, of one embodiment of a spring suspension for a rigid axle in accordance with the present invention;

FIGURE 2 is a partial top plan view on the embodiment of FIGURE 1;

*Detailed description of the drawing*

Figure 3:
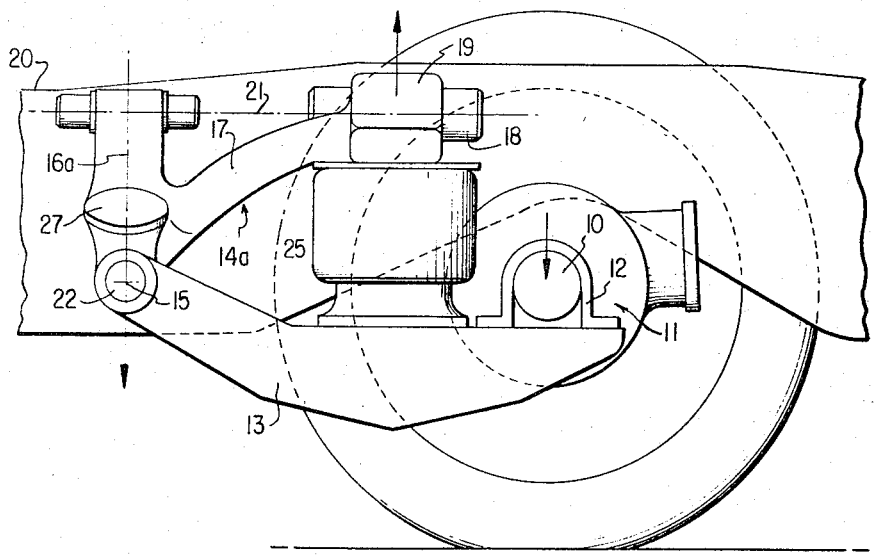
FIGURE 3 is a side elevational view of a modified embodiment of an axle spring suspension in accordance with the present invention.

Referring now to the drawing wherein like reference numerals are used throughout the various views to designate like parts, and more particularly to FIGURES 1 and 2, reference numeral 11 designates therein a rigid vehicle axle having an axle body 10 which is secured by means of shackles 12 at a box-shaped downwardly bent longitudinal guide member 13. The longitudinal guide member 13 is pivotally connected to a joint body generally designated by reference numeral 14 about an axis 15 extending in the vehicle transverse direction. The joint body 14, as viewed in side view, is of fork-shaped construction. The cross axis 15 is thereby located at the base or bottom of the fork. One fork arm 16 extends vertically in the upward direction and the other fork arm 17 is inclined rearwardly and upwardly toward the vehicle axle 11. The joint body 14 is rotatably supported at the vehicle frame 20 above the inclined fork arm 17 by means of a joint pin 18 in a main bearing 19 about an axis 21 extending in the vehicle longitudinal direction which forms the longitudinal axis of the joint. Both fork arms 16 and 17 are constructed of yoke-like shape in the manner of isosceles triangles (FIG. 2) whereby the common base of the two triangles forms the fork bottom 22 which serves on both sides as bearing pin for the bearing support of the longitudinal guide member 13 about the cross axis 15.

A torsion spring rod 23, which also is coaxial to longitudinal axis 21, is non-rotatably connected to the tip of the triangularly shaped upright fork arm 16 to rotate in unison with the fork arm 16 about this axis. The torsion rod 23 extends through the upright fork arm 16 and is rotatably supported on both sides thereof at the vehicle frame 20. This means a relieving of the main bearing 19 and serves primarily for the absorption of moments acting on the main bearing 19. At its other end 24, the torsion rod spring 23 is securely clamped to the vehicle frame 20. The torsion rod 23 serves for the spring support of the rolling movements of the vehicle about the longitudinal axis 21 of the joint.

Two pneumatic spring bellows 25 are arranged as antistroke spring means between the longitudinal guide member 13 and the inclined fork arm 17 below the main bearing 19. Main bearing 19 and pneumatic spring bellows 25 are disposed between the axle 10 and the joint cross axis 15. The fork arm 17 forms at its end across traverse, girder plate or the like on which are supported the pneumatic springs. The same spring path is thereby always available for the stroke movements of the vehicle wheels at both pneumatic spring bellows—completely independently of the roll movement.

Figure 4:
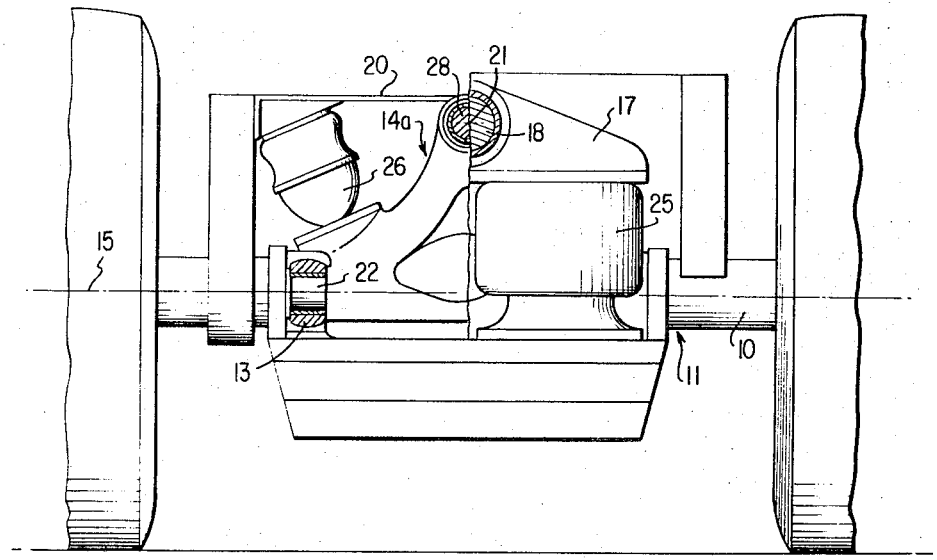
FIGURE 4 is a rear elevational view of the embodiment of FIGURE 3, with parts broken away for sake of clarity.

The embodiment according to FIGURES 3 and 4 differs from the embodiment of FIGURES 1 and 2 only by the use of different anti-roll spring means. As can be seen from FIGURES 3 and 4, rubber buffers or cushions 26 are arranged at the vehicle frame 20 on both sides of the joint longitudinal axis 21. The buffers or cushions 26 are supported on shoulders or offsets 27 at the leg portions of the upright fork arm 16a. An additional bearing support of the joint body 14a at the vehicle frame 20 by means of a joint pin 28 is provided at the tip of the upright fork arm 16a.

While we have shown and described two embodiments in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A motor vehicle, comprising: a frame; at least two axially aligned wheels, on opposite sides of the vehicle; a rigid axle means rotatably supporting said wheels; rigid guide member means carrying said axle means for pivoting movement with respect to said frame generally about a first axis at approximately the height of the wheel centers; joint body means carrying said guide member means for pivoting movement therewith with respect to said frame generally about a second axis and spaced above the first axis; first spring means connected between the frame and said joint body means resiliently resisting pivoting movement of said joint body means about the second axis; and second separate spring means connected to said guide member means and resiliently resisting movement of said guide member means about the first axis; one of said axes extending in the longitudinal direction and the other in the transverse direction.

2. The combination according to claim 1, wherein the vehicle is provided with a vehicle floor, and said longitudinal axis is arranged approximately in direct proximity of the vehicle floor.

3. The combination according to claim 1, wherein said first spring means is a torsion bar, said joint body means being of fork-like construction including an upwardly directed fork arm disposed approximately perpendicularly to the road surface and an upwardly inclined fork arm directed toward the rigid axle means, including joint pin means pivotally supporting the joint body at the vehicle frame about said second axis extending in the vehicle longitudinal direction being located above the inclined fork arm, and the fork base of said joint body means being constructed on both sides in a pin-like manner and serving as bearing support for the longitudinal guide member.

4. The combination according to claim 3, further comprising additional joint pin means pivotally supporting the upright fork arm at the vehicle body about the axis extending in the vehicle longitudinal direction.

5. The combination according to claim 4, wherein said second spring means is between the inclined fork arm and the guide member means and said first spring means is arranged between the upright fork arm and the vehicle frame.

6. The combination according to claim 5, wherein said second spring means includes one pneumatic spring bellows arranged on each side of the vehicle center and wherein said first spring means includes a torsion rod non-rotatably connected on the one hand, with the upright fork arm and, on the other, with the vehicle frame.

7. The combination according to claim 6, wherein said torsion rod is arranged substantially in the longitudinal axis and means for rotatably supporting said torsion rod at the vehicle frame on both sides of its connecting place with the upright fork arm.

8. The combination according to claim 5, wherein said first spring means include anti-roll spring means in the form of elastic cushions arranged between the upright fork arm and the vehicle frame on both sides of the longitudinal axis.

9. The combination according to claim 6, wherein said guide member means is of rectangular construction, the bearing places thereof at the joint body means and the securing places thereof at the axle means being disposed at the corners of the rectangular guide member means.

10. The combination according to claim 3, wherein said second spring means is between the inclined fork arm and the guide member means and said first spring means is arranged between the upright fork arm and the vehicle frame.

11. The combination according to claim 10, wherein said second spring means includes one pneumatic spring bellows arranged on each side of the vehicle center and wherein said first spring means includes a torsion rod non-rotatably connected, on the one hand, with the upright fork arm and, on the other, with the vehicle frame.

12. The combination according to claim 11, wherein said torsion rod is arranged substantially in the longitudinal axis and means for rotatably supporting said torsion rod at the vehicle frame on both sides of its connecting place with the upright fork arm.

13. The combination according to claim 10, wherein said second spring means comprises elastic cushions arranged between the upright fork arm and the vehicle frame on both sides of the longitudinal axis.

14. The combination according to claim 3, wherein said guide member means is of rectangular construction, the bearing places thereof at the joint body means and the securing places thereof at the axle means being disposed at the corners of the rectangular longitudinal guide member.

15. The combination according to claim 1, wherein said first axis extends in the transverse direction of the vehicle, and said second axis extends in the longitudinal direction of the vehicle.

16. The combination according to claim 15, wherein said second spring means is connected directly between said guide member means and said joint body means independent of said frame.

References Cited

UNITED STATES PATENTS

| | | | |
|---|---|---|---|
| 2,089,815 | 8/1937 | Rogers | 280—112 X |
| 2,692,778 | 10/1954 | Stump | 280—112 |

PHILIP GOODMAN, *Primary Examiner.*

U.S. Cl. X.R.

280—124; 267—11